United States Patent [19]
Boehret

[11] 3,935,747
[45] Feb. 3, 1976

[54] DEVICE FOR LOCATING MASS CENTERS AND OTHER PURPOSES

[76] Inventor: C. Franklin Boehret, 834 S. Union Street, Grass Lake, Mich. 49240

[22] Filed: July 30, 1973

[21] Appl. No.: 384,110

[52] U.S. Cl. .................. 73/483; 73/65; 248/184
[51] Int. Cl.² .......................................... G01M 1/14
[58] Field of Search ........ 73/65, 66, 455, 482, 483, 73/484, 485; 308/2 R; 33/397, 398; 248/184

[56]  References Cited
UNITED STATES PATENTS

| | | | |
|---|---|---|---|
| 915,718 | 3/1909 | Bassett | 73/483 |
| 2,493,043 | 1/1950 | Stipsky | 248/184 X |
| 3,156,067 | 11/1964 | Malko | 73/483 |

FOREIGN PATENTS OR APPLICATIONS

| | | | |
|---|---|---|---|
| 121,054 | 2/1946 | Australia | 248/184 |

Primary Examiner—Charles A. Ruehl
Attorney, Agent, or Firm—Dale Austin Winnie

[57] ABSTRACT

A device for locating mass centers, checking rotational axes and correcting for imbalance in work pieces, which includes a first and a second set of knife edge supports transversely disposed with respect to each other and having a first member received and balanced on one set of knife edge supports, for establishing a first coordinate axis, a second member received and balanced on the second set of knife edge supports, which are provided between the two members, and establish a second coordinate axis, and means for separately sensing and relaying imbalance data with respect to the two coordinate axes and as regards a workpiece received and supported on the two members in combination.

7 Claims, 14 Drawing Figures

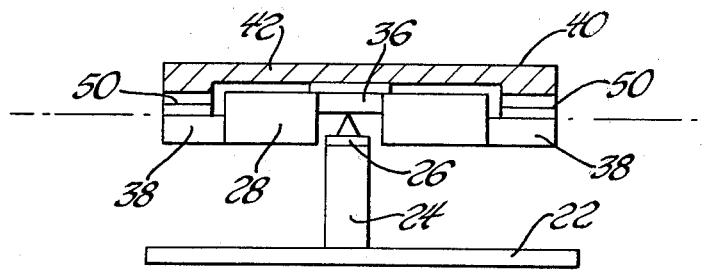
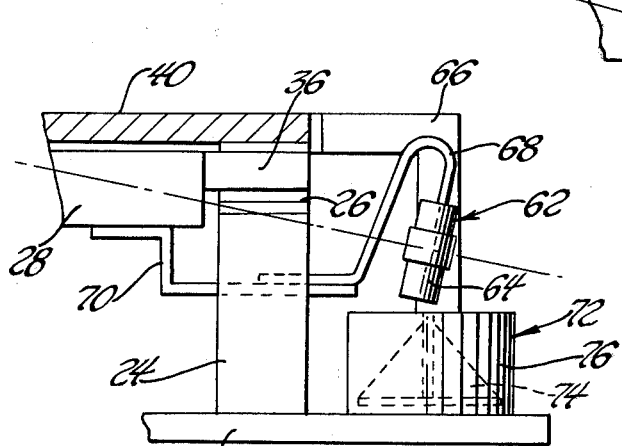
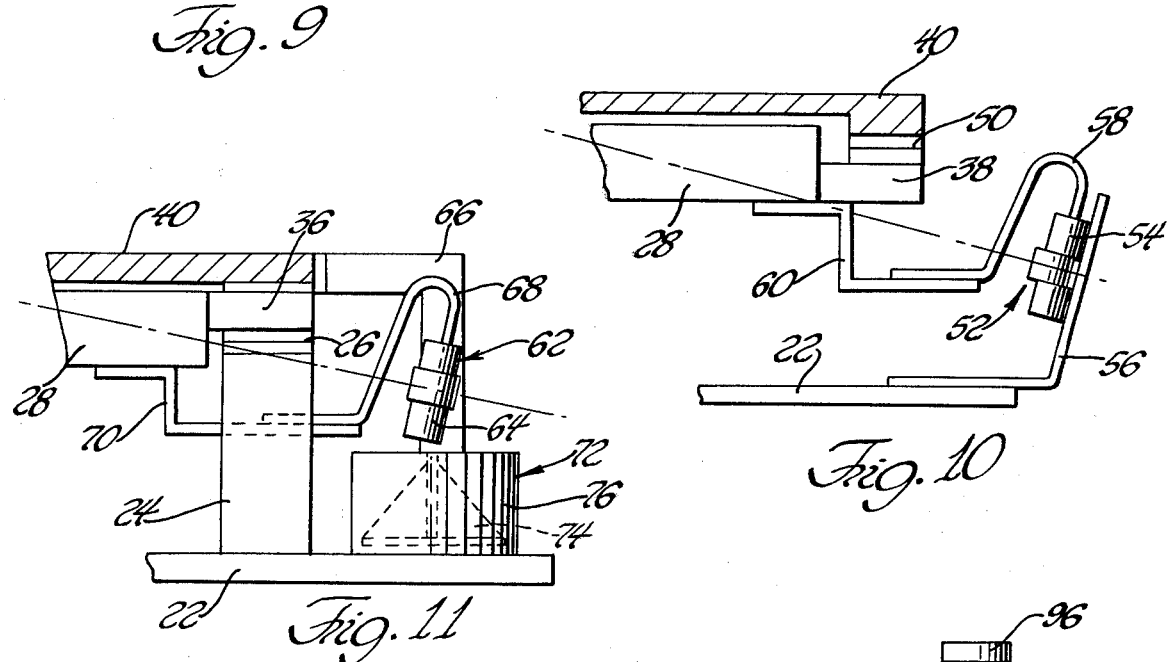
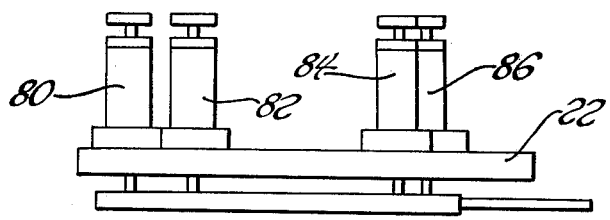
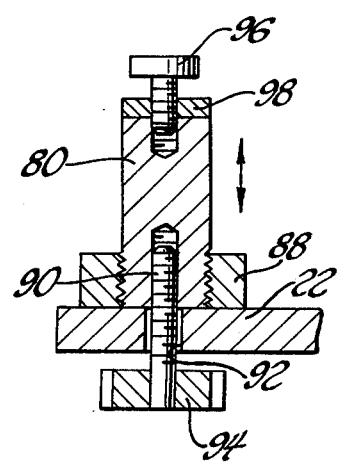
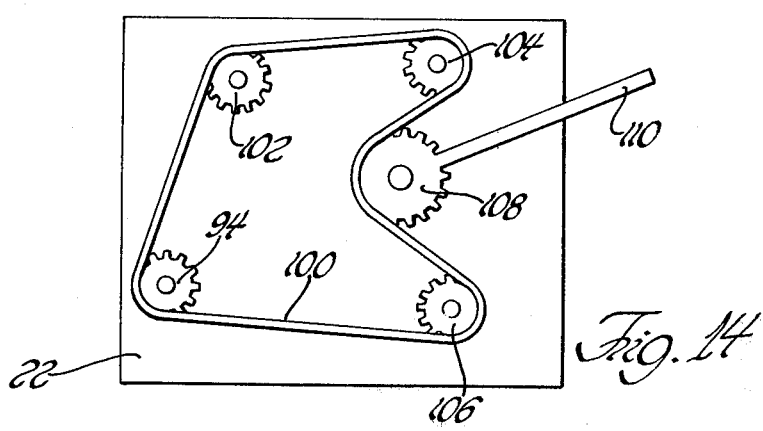

3,935,747

DEVICE FOR LOCATING MASS CENTERS AND OTHER PURPOSES

BACKGROUND OF THE INVENTION

Various methods and procedures are known and have been used in the past for determining the center of gravity, mass center, rotational axes, and weight distribution for balancing various work parts, both individually and in assembled combinations, both to provide for their balanced support, make corrections and changes, avoid force moments which induce vibrational tendencies, and the like.

Although close attention is given to such matters during their design and manufacture, the necessary tolerances required for reasonably large volume production, in particular, produces combinations or stacking of tolerance variations which can only be evaluated and corrected for within the completed part itself by equipment capable of use in the manufacturing plant and in the final inspection line.

As a consequence, such equipment must be reasonably rugged in construction and still have the high degree of sensitivity which is required of it. It must also be capable of both highly accurate readings and resonably fast response for full line inspection use and other than periodic spot-checks; as is most commonly done due to present limitations in time or accuracy imposed by presently known balancing devices.

Of still further importance, the work under test should have its centers located or be capable of being corrected at the inspection stations; which requires reasonably secure clamping for corrections and solid backing support for centers to be made immediately after the determination of the degree and extent of error or location of centers. And, correction means should be able to approach the work from either axial direction in locating or establishing centers for maximum adaptability for use on various parts and with various corrective devices.

For production use it is also important that the determinations be made within 3–10 seconds so that the transference of balancing data to establish centers and-/or the correction itself can be accomplished, if possible, within less than one minutes time.

Balancing devices which merely pass or reject a part, to a second correction line, can also prove costly where the corrections needed in a particular run are relatively minor. Reasonably fast determinations of imbalance or mass center data should be capable of being made at the inspection station, or immediately thereafter, with only those parts that are beyond line correction diverted to a corrective line which, even then, should have the corrective data fed to it from the previously made determinations.

It is with these objects in mind that the present invention has been devised.

SUMMARY OF THE PRESENT INVENTION

The present invention makes use of the knife edge balancing principal and incorporates a double use thereof for the axial coordinate determinations required.

Knife edge balancing has the advantage of allowing rugged construction for production line use and of providing precisely located and solidly supported spaced end axial locations, capable of handling a wide variety of different sized parts of varying weights.

In particular, the balancing device of this invention includes a first and a second set of knife edge supports with the knife edges of each set in precise alignment and relatively spaced apart while the respective sets of supports are disposed transversely with respect to each other to provide distinctly separate axial coordinates for balance computations. A base member establishes the reference plane and has the first set of knife edge supports mounted thereon and a first member received and supported on the first set of knife edge supports.

A second member is received and supported on the first member, upon the second set of knife edge supports, which are provided between the two members, in a manner which disposes the two coordinate axes provided by the knife edge supports in a common plane of reference precisely parallel to the base member plane.

imbalance sensing means between the first member and the base member, and between the two members themselves, accuracte readings are obtainable to within 0.000050 inches of dead center on any part supportable on the work part receptive surface of the second member.

The relatively spaced disposition of the knife edge supports, on transverse axes, enables free and unobstructed access to the work part to locate centers or for correction from either side, with suitable design of the knife edge supported members to allow the same. And, vacuum chucking of the work part is possible for like reasons, of the spacing of the knife edge supports, and simultaneously elevated stabilizing posts are capable of providing the necessary backing support to establish centers or for balance correction right at the inspection station.

DESCRIPTION OF THE DRAWING FIGURES:

FIG. 9 is another side plan view of the whole balancing device, from a different side than in the second drawing figure, and with the second knife edge supported member shown partially in cross-section.

FIG. 10 is an enlarged fragmentary detail, partially in cross-section, showing the sensing device arrangement for the first knife edge supported member.

FIG. 11 is another enlarged fragmentary detail, partially in cross-section, showing the sensing device arrangement for the second knife edge supported member, and the damper used therewith.

FIG. 12 is a side plan view of the back-up support, or stabilizing means, which is provided on the base member for use with the two knife edge supported members, which are disposed thereover but are not shown in this instance.

FIG. 13 is a cross-sectioned and enlarged detail of one of the elevated posts of the stabilizing means, shown in the immediately preceeding drawing figure.

FIG. 14 is a bottom plan view of the base plate showing the operating means for syncronous actuation of the elevating posts, as seen in looking at the underside view of FIG. 12.

DETAILED DESCRIPTION OF ILLUSTRATED EMBODIMENT

Figure 1:
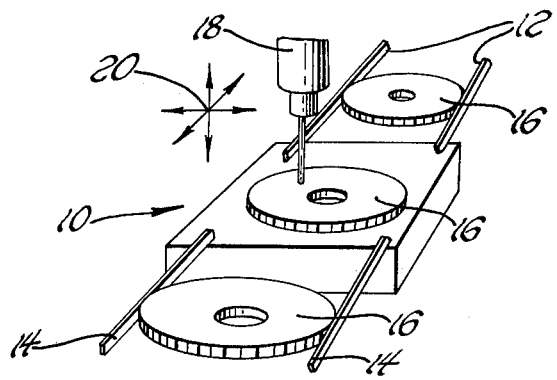
FIG. 1 is a schematic perspective of a work part production line showing the device for balance inspection, or mass center location and the corrective station envisioned by this invention.
Figure 2:
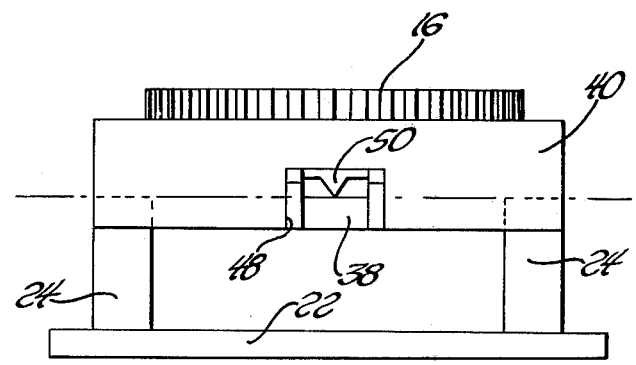
FIG. 2 is a side plan view of the balancing device of the present invention.

The device 10 of the present invention, for establishing mass centers, locating rotational axes and imbalance determinations, is shown in the first drawing figure within a production line represented by the conveyor side rails 12 and 14, leading to and from it.

A series of work pieces 16 are shown, with one at the balancing station, and a work tool 18 is positioned relatively over the balancing device for making corrections or establishing centers as required. Although the arrows 20 refer to the capability of the work tool moving fore and aft, sidewards and up and down, for the corrective work required, it will be appreciated that the balancing device itself, as a whole, could be capable of movement relative to the work tool, as by being on a work bed capable of such relative movement in response to data provided to it.

Figure 5:
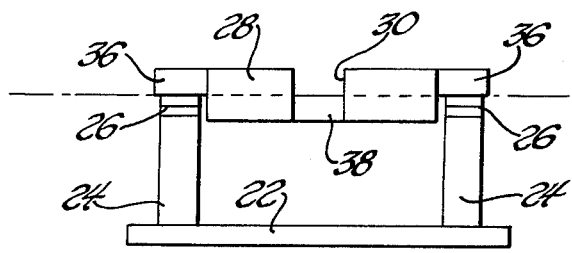
FIG. 5 is a side plan view of the first knife edge supported member on its knife edge supports.
Figure 6:
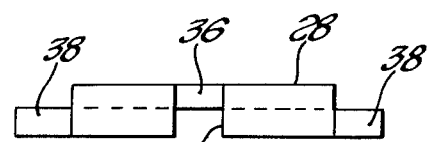
FIG. 6 is a side plan view of the first knife edge supported member, in and of itself.

The balancing device itself includes a base plate member 22, which serves as a base reference plane and is intended to be precisely leveled in the practice of the invention. It has a pair of posts 24, relatively spaced apart from each other, and on which are provided a first set of knife edge supports 26, best shown in FIGS. 5 and 9.

A first knife edge supported member 28 is received and supported on the knife edge supports 26 and it is so constructed, weighted and pre-balanced itself as to assume a balanced float relative to the reference axis, which serves as a first coordinate axis, and is created by the two knife edge supports.

As shown in FIGS. 3–6, member 28 includes a pair of channel grooves 30 and 32 provided transversely to each other and on its opposite side faces, so that they intersect and provide a center hole 34. More particularly, it should be noted and appreciated that the bottom wall of each channel groove is in the same plane of reference which, in the description which follows will be recognized as the null balance plane.

End wall projections 36 and 38 on the knife edge supported member 28, right at the channel grooves, serve to extend the reference plane and it is the oppositely disposed end wall projections 36 which are received on the first set of knife edge supports 26 and serve to support the member 28 in its balance seeking disposition over the base plate.

A second member 40 is received and supported on the first knife edge supported member 28, relatively on the other set of end wall projections 38. The member 40 provides the work surface 42 upon which a part to be balanced or whose center is to be established is received and it has depending side walls 44 which shroud and enclose the first member 28 therewithin; except for the projections 36 and 38 which are received within side wall openings 46 and 48, respectively.

Figure 7:
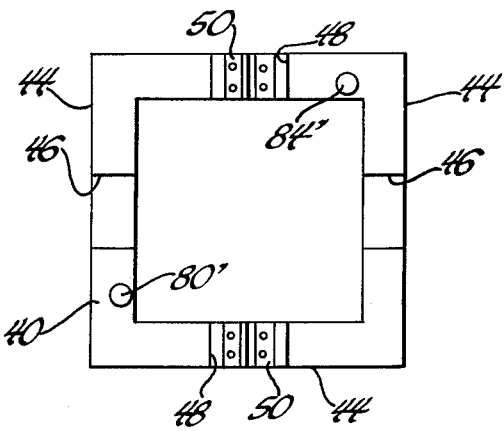
FIG. 7 is a bottom plan view of the second knife edge supported member, in and of itself.
Figure 8:
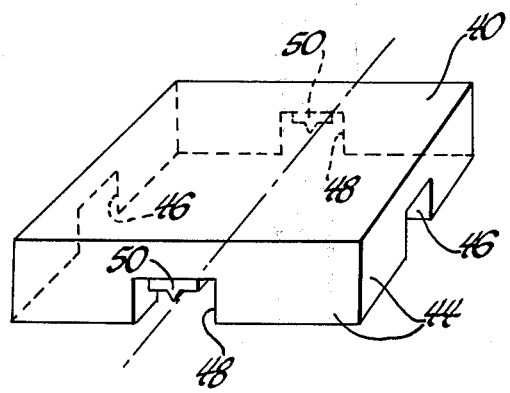
FIG. 8 is a perspective view of the second knife edge supported member with the access openings in its hidden sides shown in dotted and schematic outline, for location identification only.

A second set of knife edge supports 50 are provided within the access openings 48, as best shown in FIGS. 7 and 8, to provide a second transverse coordinate axis for the system about which the second member 40 is responsive.

Although not readily apparent in the drawing figures, it should be appreciated that both the first and second knife edge supported members 28 and 40 are so constructed and weighted that they are each relatively balanced as regards their respective balance axes, both on each side thereof and, relatively thereon and under, except that in the last instance it is preferable to have a slight weight advantage, in the order of 55%, on the underside of the second knife edge supported member which, in being carried by the first knife edge supported member adds a stability to the system, without serious consequences, for faster responsive readings.

To reiterate and make more clear the assembly as thus far described, referring to FIG. 9 it will be seen that the posts 24 on the base plate 22 include the knife edge supports 26 upon which the first knife edge supported member 28 is supported, on its end wall projections 36. And, that the second member 40 has its own knife edge supports 50 resting on the other end wall projections 38 for balancing itself, in turn, on the first member. Moreover, it will be noted that the axes of the two sets of knife edge supports intersect and lie in a common plane of reference parallel to the base plate (which serves as the reference plane) when the system is in balance.

In order to locate mass centers and/or sense and measure the imbalance in a work part, about the reference or coordinate axis provided by the knife edge supports for the first member 28, a sensing device 52, as shown in FIG. 10, is used. It includes a linear voltage differential transformer (LVDT) arrangement which, in this instance, has the coil 54 fastened to a bracket 56 on the base plate member 22 and the core member 58 provided on a bracket 60 to the underside of the knife edge supported member 28. Since the core movement is relatively about the first coordinate axis provided by the knife edge supports for the member 28, it will be noted that the coil is disposed tangential to a reference line through the balance axis so that core movement is essentially linear.

The relative movement of the second knife edge supported member 40 is also measured by an LVDT arrangement 62, as shown in FIG. 11. However, in this instance the coil 64 is fastened to a bracket 66 attached to the member 40 and the core 68 is provided on another bracket 70 which is fastened to the underside of the first knife edge supported member 28. The coil in this instance is tangential to a reference line through the second coordinate axis and disposed so that movement of the core relatively therewithin is again essentially linear.

Of particular note as regards core and coil disposition, and relative movement therebetween, is that the second knife edge supported member 40 is received and supported, and moves relatively with, the first knife edge supported member 28 about the first coordinate axis but such movement is detectable only with respect to the second coordinate axis due to the relative disposition of the detection means in line with the first coordinate axis which makes it unresponsive to lateral movement on either side thereof. Similarly, although the first knife edge supported member 28 carries the second knife edge supported member 40 its detection means is disposed in line with the second coordinate axis and is therefore unresponsive and undiluted or effected by relative movement of the second knife edge supported member about the second coordinate axis. Both knife edge supported members are thus essentially isolated and relatively separated from each other as regards any detection of axial movement of one with respect to the other and their respective means for detecting individual relative movement about their own knife edge supporting means are consequently capable of transmitting an undiluted and essentially true and pure signals for precise vectorial resolution of the force problem presented by a work piece under examination.

Although somewhat schematically illustrated, FIG. 11 also shows a damper arrangement 72 for the second knife edge supported member 40 (and hence the whole system) in having a vaned piston member 74 in a viscous fluid container 76 provided on the bracket arm 66.

In the last three drawing FIGS. 12–14 is shown a means and method for engaging and stabilizing the two knife edge supported members and therby providing a positive backing support that enables corrective work or inserting centers on a work piece immediately following the determination of the amount of error or location of centers right at the inspection station.

Figure 3:
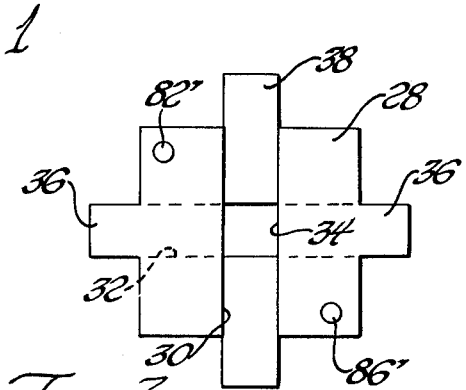
FIG. 3 is a top plan view of the first knife edge supported member, in and of itself.
Figure 4:
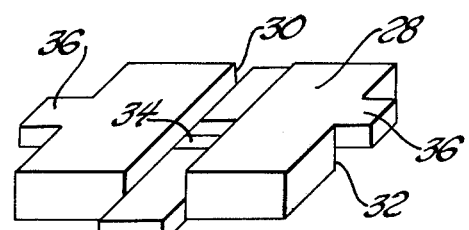
FIG. 4 is a perspective view of the first knife edge supported member.

It includes four elevating posts 80, 82, 84 and 86 with the outer two thereof, 80 and 84, disposed for engagement with the second knife edge supported member 40 on relatively opposite sides of its knife edge supports, at spots marked 80' and 84' in FIG. 7, and with the inner two thereof, 82 and 86, having like engagement with the underside of the first knife edge supported member, at spots identified 82' and 86' in FIG. 3.

One of the elevating posts 80 is shown in an enlarged cross-sectional view by FIG. 13 to illustrate their respective construction. And, as shown, it includes an internally threaded ring 88 within which the lower end of the post is threaded so that it is raised as it is turned in one direction and lowered as it is turned in the opposite direction. A pin 90 tightly screwed or press fitted into the base of the post, and extended through an access hole 92 in the base plate, has a gear 94 on its end to effect the necessary rotation. And an adjustment screw 96 in a smaller nut 98 on top of the post allows for more finite adjustment in the initial set-up.

By means of a chain drive 100 about the gear members 94, 102, 104 and 106 on the different posts, and a drive gear 108 shown with a handle for manual operation thereof, it will be appreciated that all four posts may be simultaneously elevated or retracted for stabilizing support, or allowing free balance, as desired.

I claim:

1. A device for locating mass centers and the like, comprising; a first and second set of knife edge supports with knife edges of each set in precise alignment and relatively spaced apart and with the respective sets of knife edge supports disposed transversely with respect to each other for providing distinctly separate axial coordinates for balance computations, a base member for establishing a reference plane and having the first of said knife edge support sets provided thereon, a first member supported upon said first knife edge support set, a second member formed to receive and essentially enclose said first member therewithin for supported engagement upon said second knife edge support set, said second knife edge support set being provided on one of said first and second members whereby said second member is relatively supported and balanced upon said first member and is receptive of a work part thereon for evaluation, said first member having a first channel groove provided on the underside thereof and first means at relatively opposite ends thereof received upon said first knife edge support set, a second channel groove provided across said first member on the other side thereof and second means at relatively opposite ends thereof providing balancing support for said second channel groove being formed precisely to the depth of said first channel groove for intersection therewith and for disposing the bottom walls of each of said channel grooves in a common plane of reference relatively within and between the opposite side faces of said first member.

2. The balancing device of claim 1, said first and second means including extensions having wall surfaces thereof contigious with said first and second channel grooves and projecting beyond the end wall edges thereof for knife edge support engagement.

3. The device of claim 1, said first and second members being each relatively balanced to close tolerances on opposite sides of their respective knife edge supporting sets and each having a preponderance of weight no greater than 55% relatively below their respective balance axes.

4. The device of claim 1, said second member including depending side walls therearound receiving and substantially enclosing said first member therewithin.

5. The device of claim 4, said second member having openings in said depending side walls and having first and second means having the extensions thereof receptive therewithin, and said second knife edge support set being provided within relatively opposite of said side wall openings in said second member for providing the means of relatively balanced support therefor and on said first member.

6. The device of claim 5, including relatively coordinated stabilizing pads provided on said base member and having means of elevating the same simultaneously for engagement of different sets thereof respectively with said first and second members on relatively opposite sides of their respective balancing axes.

7. The device of claim 5, including balance seeking damper means provided on said second member, and imbalance sensing and signalling means provided for said first member between said base member and first member and for said second member between said first and second members.

* * * * *